United States Patent
Quilici et al.

(10) Patent No.: US 9,239,142 B2
(45) Date of Patent: Jan. 19, 2016

(54) EDGE-LIT LIGHT FIXTURE INCORPORATING A DOWNLIGHT AND HAVING A UNIFORM EXTERNAL APPEARANCE

(75) Inventors: Michael Quilici, Essex, MA (US); Ernest Davey, Jr., Salem, NH (US)

(73) Assignee: OSRAM SYLVANIA INC., Wilmington, MA (US)

( * ) Notice: Subject to any disclaimer, the term of this patent is extended or adjusted under 35 U.S.C. 154(b) by 199 days.

(21) Appl. No.: 13/159,989

(22) Filed: Jun. 14, 2011

(65) Prior Publication Data

US 2012/0320626 A1    Dec. 20, 2012

(51) Int. Cl.
| | |
|---|---|
| F21V 7/04 | (2006.01) |
| F21S 8/04 | (2006.01) |
| F21Y 101/02 | (2006.01) |
| F21Y 113/02 | (2006.01) |
| F21V 8/00 | (2006.01) |

(52) U.S. Cl.
CPC ............... F21S 8/04 (2013.01); G02B 6/0035 (2013.01); *F21Y 2101/02* (2013.01); *F21Y 2113/02* (2013.01); *G02B 6/003* (2013.01); *G02B 6/0051* (2013.01)

(58) Field of Classification Search
CPC .. G02B 6/0068; G02B 6/0038; G02B 6/0043; G02B 6/0073; G02B 6/0051; G02B 6/0035; G02B 6/003; F21S 8/04
USPC ............... 362/23.08, 23.09, 23.1, 23.17, 613, 362/620, 626, 222, 225, 231, 236, 238, 240, 362/242, 246, 249.02, 249.06, 249.14, 97.1, 362/97.2, 97.3, 97.4; 349/68
See application file for complete search history.

(56) References Cited

U.S. PATENT DOCUMENTS

| | | | | |
|---|---|---|---|---|
| 3,491,245 | A * | 1/1970 | Hardesty | 250/227.11 |
| 4,949,226 | A * | 8/1990 | Makita et al. | 362/538 |
| 6,608,614 | B1 * | 8/2003 | Johnson | 345/102 |
| 6,842,204 | B1 * | 1/2005 | Johnson | 349/74 |
| 7,036,946 | B1 * | 5/2006 | Mosier | 362/27 |

(Continued)

FOREIGN PATENT DOCUMENTS

| | | |
|---|---|---|
| DE | 102006056150 A1 | 5/2008 |
| EP | 1555477 A1 | 7/2005 |

OTHER PUBLICATIONS

Machine Translation by EPO and Google of specification of EP1555477 published Jul. 20, 2005 by Zumtobel Staff GmbH.

(Continued)

*Primary Examiner* — Evan Dzierzynski
*Assistant Examiner* — Tsion Tumebo
(74) *Attorney, Agent, or Firm* — Andrew Martin

(57) ABSTRACT

A light fixture and method for producing downward-propagating illumination that includes an edge-lit lightguide illuminated from its perimeter. The lightguide has a light extractor, such as a dot pattern on its bottom surface, which extracts a portion of the light from inside the lightguide and directs it to a diffuser. The fixture also includes a downlight, arranged above the lightguide and producing a downlight beam downward. The downlight beam transmits from the top face through the bottom face of the lightguide and emerges from the bottom face of the lightguide as a directional beam. The downlight beam has a downlight beam footprint. The light extractor has a light extractor area that excludes the downlight beam footprint, and the diffuser has a diffuser area that also excludes the downlight beam footprint.

15 Claims, 5 Drawing Sheets

(56) References Cited

U.S. PATENT DOCUMENTS

| | | | |
|---|---|---|---|
| 7,430,028 B2 * | 9/2008 | Tsai et al. ........................ | 349/65 |
| 7,661,862 B2 * | 2/2010 | Lee et al. ....................... | 362/559 |
| 7,806,580 B2 * | 10/2010 | Lin ............................... | 362/606 |
| 8,033,706 B1 * | 10/2011 | Kelly et al. .................... | 362/607 |
| 2008/0157009 A1 * | 7/2008 | Wittenberg et al. ....... | 250/494.1 |
| 2011/0069277 A1 * | 3/2011 | Blixt et al. .................... | 351/210 |
| 2011/0242804 A1 * | 10/2011 | Yang et al. .................... | 362/231 |
| 2012/0105765 A1 * | 5/2012 | Kawai et al. .................... | 349/62 |
| 2012/0113676 A1 * | 5/2012 | Van Dijk et al. .............. | 362/606 |

OTHER PUBLICATIONS

PCT/US2012/040275 International Search Report mailed Aug. 31, 2012.

* cited by examiner

EDGE-LIT LIGHT FIXTURE INCORPORATING A DOWNLIGHT AND HAVING A UNIFORM EXTERNAL APPEARANCE

TECHNICAL FIELD

The present invention relates to edge-lit light fixtures that produce both diffuse light and a directional beam, while maintaining a uniform external appearance.

BACKGROUND OF THE INVENTION

Light emitting diodes (LEDs) are become more commonplace in general illumination applications, such as office spaces and conference rooms. For example, an edge-lit panel uses LEDs at its light source, and is become increasingly common for ceiling-based applications, such as incorporation into ceiling tiles. While edge-lit panels tend to have a pleasing, uniform external appearance, such edge-lit panels tend to produce only diffuse light.

There are some instances where a user may want to use an additional directional beam, such as a spotlight or accent light, for illuminating a particular task or space. Typically, the user has to install a separate fixture that provides such a directional beam, often referred to as a downlight. Use of a separate fixture is unwieldy, and may not be aesthetically pleasing.

Early attempts to incorporate a downlight source into an edge-lit fixture involved cutting a hole directly through the fixture, placing the downlight in the hole, and using a bezel or mask to hide the edge where the hole is cut. These attempts may have produced both the diffuse light and the directional beam, but they lacked the pleasing, uniform external appearance of the uncut edge-lit panel.

Accordingly, there exists a need for a single light fixture that can produce both diffuse light and a directional beam, while maintaining a uniform external appearance.

SUMMARY OF THE INVENTION

An embodiment is a light fixture for producing downward-propagating illumination. The fixture includes an edge-lit lightguide illuminated with internal light from its perimeter. A downlight produces a downlight beam having a downlight beam footprint. The downlight beam transmits from a top face of the lightguide to a bottom face of the lightguide and emerges from the bottom face of the lightguide as a directional beam. A light extractor is coupled to the lightguide. The light extractor has a light extractor area that excludes the downlight beam footprint. The light extractor directs a predetermined amount of the internal light through the bottom face of the lightguide to form external light. A diffuser is longitudinally adjacent to the bottom face of the lightguide. The diffuser has a diffuser area that excludes the downlight beam footprint. The diffuser receives the external light and transmits diffuse light.

Another embodiment is a light fixture for producing downward-propagating illumination. The fixture includes an edge-lit lightguide. A downlight is disposed adjacent to a top face of the lightguide for directing directional light through the lightguide and out a bottom face of the lightguide. The directional light has a downlight beam footprint. A plurality of peripheral LEDs are disposed around a perimeter of the lightguide for emitting light into the lightguide. A light extractor is coupled to the lightguide for directing light out of the lightguide to form extracted light. The extractor area excludes the downlight beam footprint. A diffuser is longitudinally adjacent to the bottom face of the lightguide. The diffuser receives extracted light from the light extractor and transmits diffuse light out of the light fixture. The directional light has a more narrow angular spread than the diffuse light. The directional light has the same spectral profile as the diffuse light.

Another embodiment is a method for producing both diffuse light and a directional beam from the same illumination light fixture. The method includes: illuminating an edge-lit lightguide from its perimeter to form internal light; producing a downlight beam having a downlight beam footprint and transmitting through the lightguide to emerge from a bottom face of the lightguide as a directional beam; providing a light extractor coupled to the lightguide, the light extractor having a light extractor area that excludes the downlight beam footprint; extracting a portion of the light from the lightguide with the light extractor to form external light; providing a diffuser adjacent to the bottom face of the lightguide, the diffuser having a diffuser area that excludes the downlight beam footprint; and directing the external light through the diffuser to form diffuse light.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF THE INVENTION

In this document, the directional terms "up", "down", "top", "bottom", "side", "lateral", "longitudinal" and the like are used to describe the absolute and relative orientations of particular elements. For these descriptions, it is assumed that the light fixture is mounted overhead, such as being incorporated into a ceiling tile or ceiling grid, and that the light fixture directs its output generally downward toward a user. It will be understood that while such descriptions provide orientations that occur in typical use, other orientations are certainly possible. For instance, the fixture may be wall-mounted or incorporated into additional elements to provide indirect lighting. The noted descriptive terms, as used herein, still apply to the fixture, even if the fixture has an orientation other than overhead, or is uninstalled in its overhead orientation.

A light fixture and method for producing downward-propagating illumination are disclosed. The fixture includes an edge-lit lightguide illuminated from its perimeter. The lightguide has a light extractor, such as a dot pattern on its bottom surface, which extracts a portion of the light from inside the lightguide and directs it to a diffuser. The diffuser randomizes the direction of the extracted light and forms diffuse light. The fixture also includes a downlight, arranged above the lightguide and producing a downlight beam downward. The downlight beam transmits from the top face through the bottom face of the lightguide and emerges from the bottom face of the lightguide as a directional beam. The downlight beam has a downlight beam footprint. The light extractor has a light extractor area that excludes the downlight beam footprint, and the diffuser has a diffuser area that also excludes the downlight beam footprint. The fixture can produce both diffuse light and a directional beam, while maintaining a generally uniform external appearance. Note that the diffuse light and the directional beam may have separate switches and/or controls so that they may be operated independently, or may alternatively both be on the same switch.

There may be potential advantages to such fixtures. For instance, an example of an application that relies on the generally uniform external appearance is one in which an array of edge-lit panels are mounted in a ceiling to simulate the appearance of a skylight or a cloud. In such an array, the uniform appearance would be lost if holes were cut through any of the fixtures to accommodate downlights. By using the fixtures disclosed herein, the desired uniformity of the panels may be maintained, while having the flexibility to incorporate a downlight or other light source if desired.

Figure 1:
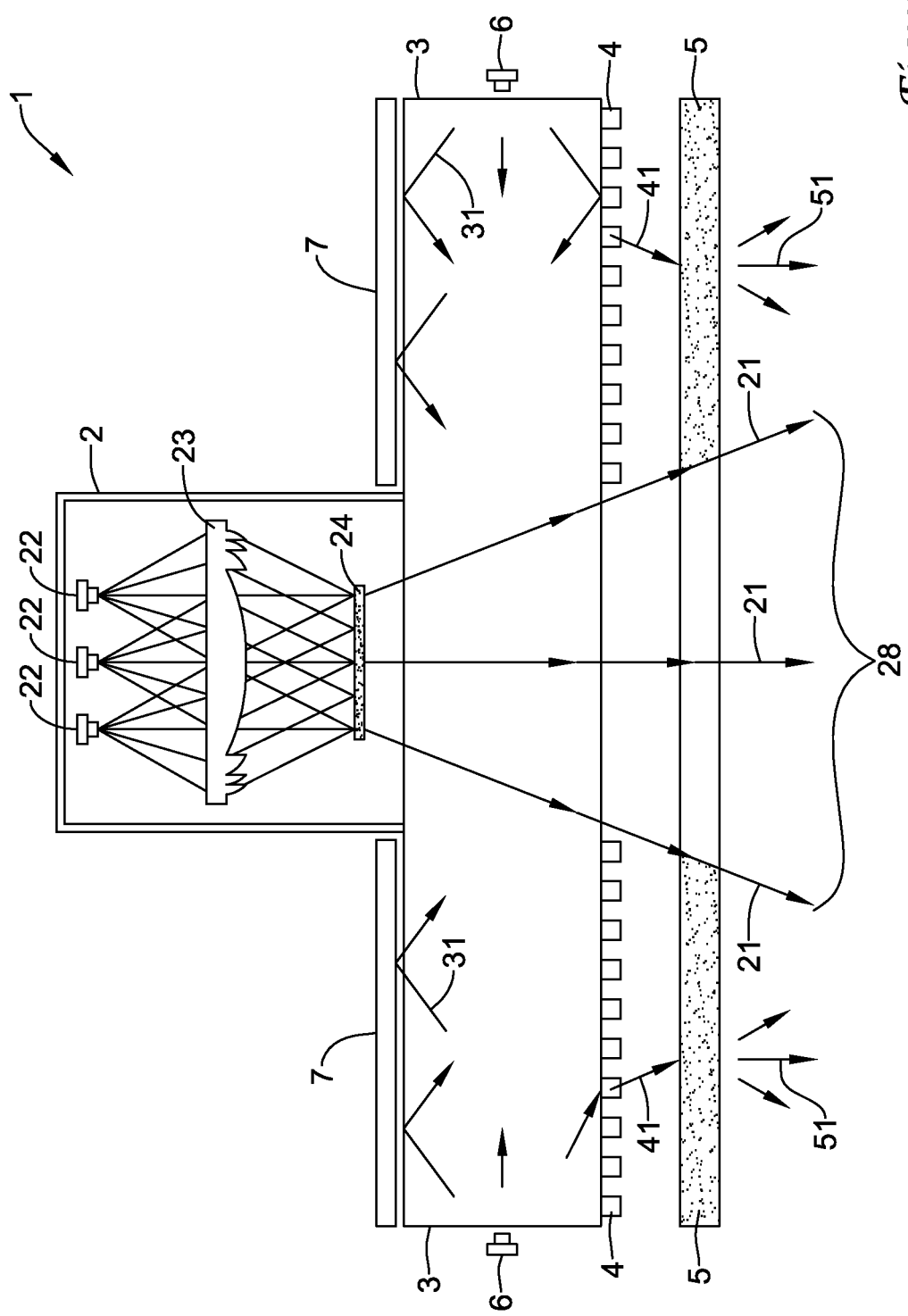
FIG. 1 is a side-view schematic drawing of an example light fixture that can produce both diffuse light and a directional beam while maintaining a uniform external appearance.

FIG. 1 is a side-view schematic drawing of an example light fixture 1 that can produce both diffuse light and a directional beam while maintaining a uniform external appearance. The lightguide portion of the fixture is described first, followed by a description of the downlight portion.

The light fixture 1 includes a lightguide 3, which may be a sheet of transparent material, such as PMMA. The lightguide 3 may be thick enough to support itself without bending, or may be thin enough to be bendable. In general, the lightguide 3 may be generally planar, optionally with one or more predetermined wedge angles that in some cases may beneficially affect the output properties from the fixture 1. The shape, or footprint, of the lightguide 3 may be rectangular, square, round, elliptical or any other suitable shape. In some cases, the footprint of the lightguide may be matched to the size of a ceiling tile, such as two feet by two feet, or two feet by four feet. The lightguide 3 may occupy the entire area allocated for the ceiling tile, or may have a border around its perimeter.

The lightguide 3 receives light emitted by a series of LEDs 6, distributed around the perimeter of the lightguide 3. The output of the LEDs 6 may be oriented laterally. Each light emitting diode 6 may be a bare chip, or may have a lens, such as a hemisphere or partial sphere, mounted on it to reduce the angular divergence from the light emitting diode 6.

The emitted light from each light emitting diode 6 enters a lateral edge of the lightguide 3, typically with an angular distribution centered about a local surface normal. Once inside the lightguide 3, the light may be referred to in this document as "internal" light 31.

The internal light then progresses inward from the lateral edge of the lightguide 3 by reflecting off the front and rear surfaces of the lightguide 3. The reflections are typically total internal reflections, for which the angle of incidence exceeds the critical angle, and for which 100% of the optical power is reflected. For a lightguide 3 having a refractive index of n, and an air/lightguide interface, the critical angle is given by $\sin^{-1}(1/n)$, which is measured inside the lightguide 3 with respect to the local surface normal at the interface. Note that for a refractive index greater than the square root of 2 (approximately 1.41), all the internal light 31 that enters through a lateral edge will totally internally reflect at an orthogonal lateral edge. Such is the case for typical lightguide 3 materials, such as PMMA, which has a refractive index of 1.503 at a wavelength of 435.8 nm and 1.486 at 700 nm.

In order to extract some of the light from the lightguide 3, the lightguide 3 may have a so-called "light extractor" 4 on its top or bottom surface. Such a light extractor 4 is designed to redirect a predetermined portion or fraction of the internal light at each location over the area of the lightguide 3. In general, it may be desirable to have a uniform or nearly uniform amount of power exiting the fixture, or, in some cases, incident at each point on the diffuser 5. As a result, the light extractor 4 is usually designed to redirect more light, percentage-wise, from the center of the lightguide 3, compared with at the edge of the lightguide 3. The properties of the light extractor 4 are controllable as a function of location, and are generally determined in advance by simulation of the optical system of the fixture 1. Such simulation may include multiple bounces within the lightguide 3, and bounces off the lateral edges of the lightguide 3.

There are a number of options available for the light extractor 4. In general, the light extractor 4 is coupled to the lightguide 3. Typically, the light extractor includes a series of light extracting features on the top surface, on the bottom surface, and/or embedded within the lightguide 3. The light extracting features may be a repeated feature, such as a series of bumps, depressions, paint dots, or small embedded particles with a refractive index differing from the lightguide material.

One option for the light extractor 4, shown in FIG. 1, is a series of printed dots on the bottom surface of the lightguide 3. The dot pattern may be determined beforehand by simulation, prior to the production of the actual parts. Another option includes a series of prismatic surfaces on the bottom surface of the lightguide 3, which may be regular in one or both directions, may be irregular in one or both directions, and may have an apex angle of greater or less than 90 degrees. A further option may be the selective roughening of the bottom surface of the lightguide 3. In FIG. 1, the light extractor 4 is shown as having regularly spaced dots on the underside of the lightguide 3; in practice, the size and spacing of dots may vary across the lightguide 3 surface, in order to extract more light, percentage-wise from the interior of the lightguide 3, compared with at the edge.

Other options for the light extractor 4 include printed or painted dots on the top surface of the lightguide 3, in addition to or instead of on the bottom surface, as shown in FIG. 1. The light extractor 4 may also include a diffuse reflective material behind it, so that any light that exits the top surface of the lightguide 3 may be reflected back into the lightguide 3 and may eventually exit the lightguide 3 through the bottom surface.

Note that the light extractor 4 is absent from the bottom side of the lightguide 3 in the vicinity of the downlight beam footprint 28. It is intended that within the downlight beam footprint 28, the fixture 1 outputs only, or primarily, a directional beam 21, rather than diffuse light 51, so that within this footprint 28, little or no internal light 31 is redirected from the interior of the lightguide 3. In other words, the light extractor 4 may have a light extractor area that excludes the downlight beam footprint 28.

Light emerging out of the lightguide 3 from the light extractor 4 may be referred to as "external" light 41. The external light 41 may have an asymmetric angular profile, generally with more light propagating at high angles of exitance than at small angles of exitance (both made with respect to a surface normal with respect to the plane of the lightguide 3). Such an angular profile would be generally unacceptable as the output for a lighting fixture, so the fixture 1 uses a diffuser 5 to receive the external light 41, randomize the propagation directions for the particular rays, and output diffuse light 51.

The diffuse light 51 may have a more symmetric angular profile than the external light 41. In some cases, the diffuse light 51 may have a Lambertian distribution, with the angular output peaking in the downward direction, and the angular output falling to zero at the plane parallel to the lightguide 3. The angular distribution of the diffuse light 51 is controlled by the properties of the diffuser 5, which may be determined by simulation prior to the building of any of the parts for the fixture 1. In general, the weaker the diffuser 5, the more the diffuse light 51 resembles the output light 41; the stronger the diffuser 5, the more the diffuse light 51 resembles a Lambertian distribution.

One example of a diffuser is a volumetric element that has a background material, and particles immersed in the background material, where the particles have a different refractive index from the background material. Such a diffuser produces a multitude of interactions for each light ray that passes through it, where each time a ray enters or leaves one of the particles, it experiences a deviation in path due to refraction at each interface, and experiences a slight splitting in which a portion is split off to its path due to a small reflection at each interface. The individual refraction and splitting interactions may be quite small, but the combined effects of many of these interactions is to effective randomize the output angle of a particular ray, regardless of the specific input angle of the ray.

The particles may be relatively small, on the order of five microns or larger. The particles may have roughly the same size, or may have a distribution of different sizes. The particles may all have the same shape, optionally with a predetermined alignment of the particles. The particles may alternatively all have different shapes and/or sizes. The difference in refractive index between the particles and the background material may be relatively small, such as on the order of 0.001 or larger. The particles may be referred to as "scattering" particles.

Other types of diffusers are possible, including elements having one or more roughened surfaces.

Figure 2:
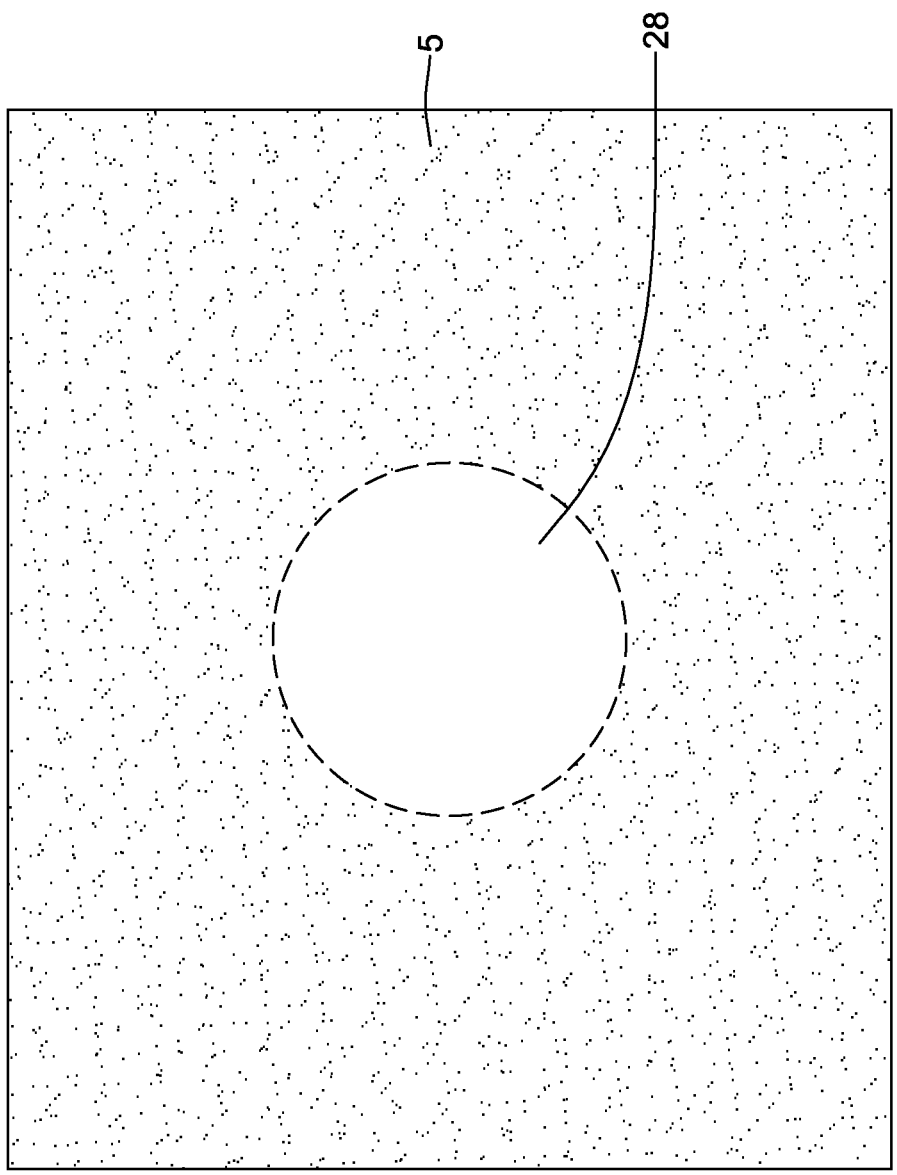
FIG. 2 is a bottom-view drawing of the diffuser from the light fixture of FIG. 1.

Like the light extractor 4, the diffuser 5 may have a "clear" spot in the vicinity of the downlight beam footprint 28. In this footprint, the diffuser 5 may just have the background material, without any scattering particles in this particular area. In general, because the light extractor 4 may not extract any light in the footprint 28, there may not be any external light 41 in the footprint 28, and there may be no need for diffusing within the footprint 28. In other words, the diffuser 5 may have a diffuser area that excludes the downlight beam footprint 28. For instance, FIG. 2 is a bottom-view drawing of the diffuser 5 from the light fixture 1 of FIG. 1.

There may be an additional reflector 7 on or near the top surface of the lightguide 3, to redirect any errant light that inadvertently exits the top surface of the lightguide 3. Such errant light may be redirected to be part of the output from the fixture 1. This errant light may be treated in the simulation stage of the fixture 1.

Thus far, the description has concentrated mainly on the elements around the lightguide 3. For some cases, many of these elements may be similar to known edge-lit panels, with the exception of their properties in the vicinity of the footprint 28 from the directional beam 21. The downlight 2 is now described.

In general, the function of a downlight 2 is to produce relatively strong illumination within a predetermined angular range, and relatively weak illumination outside the angular range. The output properties of such a downlight 2 may be somewhat more sophisticated than a typical incandescent spotlight, and may include photometric specifications, such as intensity as a function of propagation angle (usually given in candelas, cd), on-axis power/area as a function of distance to the illuminated plane (usually given in foot-candles, fc), and beam diameter as a function of distance to the illuminated plane (usually given in feet, ft). In some cases, the downlight 2 may include elements that allow for control over photometric quantities such as these, and may allow for optimization of one or more quantities or refinement of one or more quantities. For the example downlight 2 described below, the output may have generally uniform intensity (power/area) at a particular plane, a generally uniform angular output within a predetermined angular range, and a relatively small tail to the angular output at the edge of the angular range.

Figure 4:
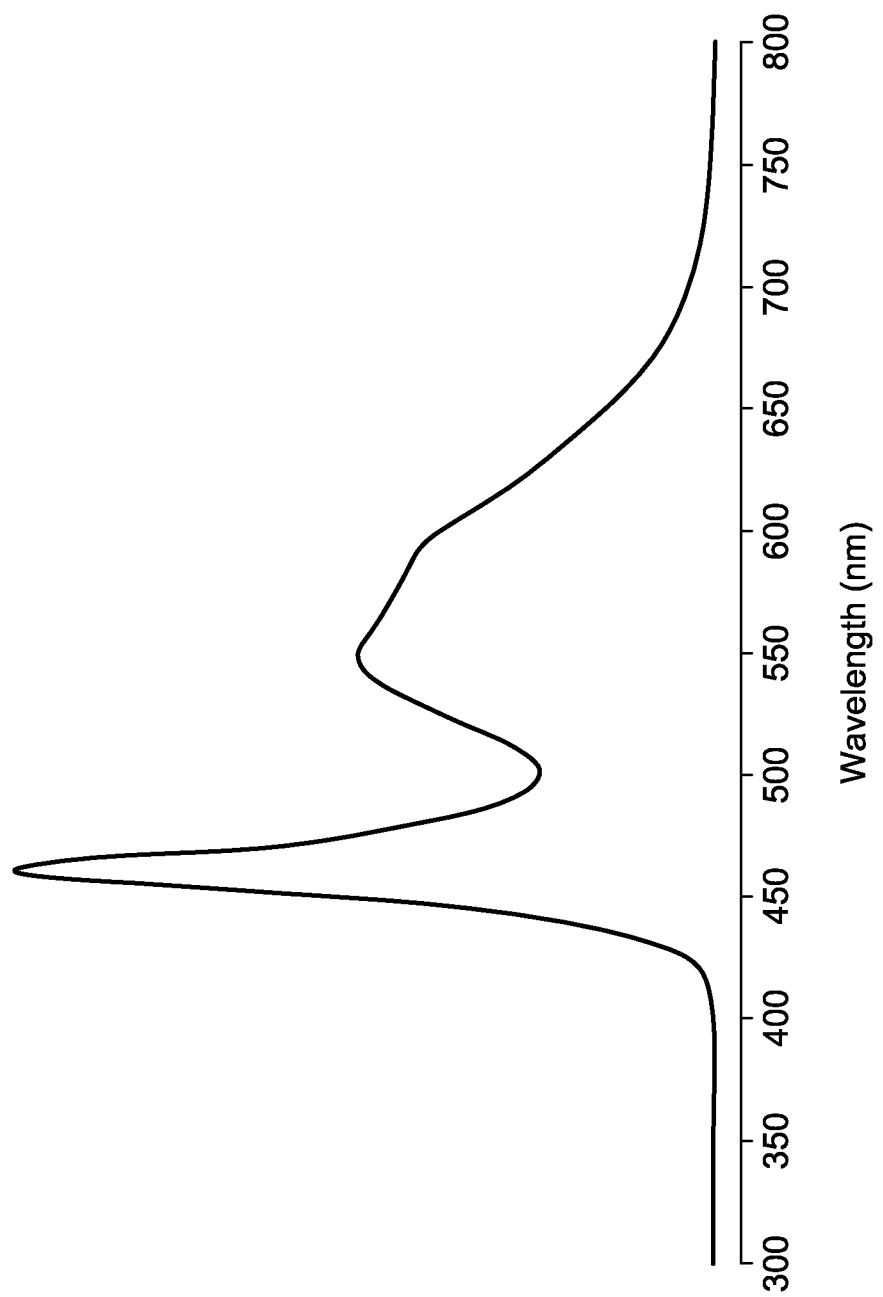
FIG. 4 is a plot of an example spectral profile for a phosphor-based white-light light emitting diode.

The light from the downlight 2 may be produced by one or more LEDs 22. In some cases, these LEDs 22 have the same spectral properties as the LEDs 6 that surround the lateral edge of the lightguide 3, so that the directional beam 21 and the diffuse light 51 may be perceived as being the same color. In other cases, the LEDs 22 may have a deliberately different spectrum than the LEDs 6, in order to produce an accenting effect in the directional beam 21. In some cases, the LEDs 22 may be phosphor-based white-light LEDs, with an example spectrum as show in the plot of FIG. 4. The downlight 2 may include a number of LEDs, including 1, 2, 3, 4, 5, 6, 7, 8, 9, 10, 12, 14, 16, 18, 20, 22, 24, or more than 24. Although three LEDs 22 are shown in the example of FIG. 1, it will be understood that any number of LEDs 22 may be used.

The LEDs 22 may be arranged in any suitable pattern, such as in a rectangular or polar grid. In general, the outer edge of the LED placement pattern helps determine the angular output of the directional beam 21. For instance, a generally round distribution of LEDs (i.e., roughly uniform distribution of LEDs having a circular outline), the directional beam 21 may be generally circularly symmetric. For an elongated distribution of LEDs, the direction beam 21 may also be elongated. Note that these two examples assume that the other optical elements are rotationally symmetric; any asymmetries in the LEDs placement may be caused or corrected by other asymmetries in the other optical elements.

The output from each LED 22 diverges away from the respective LED 22, and is collected by a Fresnel lens 23. The plane of LEDs 22 is located at or near a front focal plane of the Fresnel lens 23, so that after the Fresnel lens 23, the light from each LED 22 may be collimated, but the light from each LED 22 may propagate at a different angle than the light from all the other LEDs 22. Note that a Fresnel lens 23 is drawn in FIG. 1, but any suitable lens may be used, including refractive and/or diffractive optics, and/or binary optics (having squared-off portions at discrete levels between the steps, as opposed to the curved portions between the steps of the Fresnel lens 23). The lens or lenses may be made integral with the LEDs, or may be remotely fixed. In each case, the plane of the LEDs 22 may be placed at or near the front focal plane of the lens.

At the rear focal plane of the Fresnel lens 23, there is a circle over which there is uniform illumination. Note that within this circle, each point in the circle receives light from every LED 22.

A downlight diffuser 24 may be placed at or near this rear focal plane of the Fresnel lens 23. This downlight diffuser 24 may be weaker than the diffuser 5 described above, because the need for angular redistribution of the light may be much less than is required for the diffuser 5. For the diffuser 5, the external light 41 may have a severe asymmetry that is converted by diffuser 5 into a relatively symmetric diffuse light 51. Unlike the diffuser 5, the downlight diffuser 24 merely performs a smoothing function on the angular distribution, rather than a drastic reshifting of angles. The amount of smoothing may be dictated by the placement positions of the LEDs 22 and the focal length of the Fresnel lens 23. Typically, the light produced by one LED is smoothed into the light from the adjacent LEDs, so that the peaks and valleys in the angular distribution are minimized. Note that while smoothing the angular profile may smooth out the peak-to-valley intensity angular variations within the directional beam 21, it may also smear out the edge of the directional beam 21.

To summarize the downlight 2, a plurality of downlight LEDs 22 may be longitudinally separated from the top face of the lightguide 3. A Fresnel lens 23 may be disposed longitudinally adjacent to the plurality of downlight LEDs 22. A downlight diffuser 24 may be disposed longitudinally adjacent to the Fresnel lens 23. Light from the plurality of downlight LEDs passing through the Fresnel lens 23 and the downlight diffuser 24 appears generally uniform when viewed at the downlight diffuser 24. In some cases, the plurality of downlight LEDs 22 may be disposed at a front focal plane of the Fresnel lens 23. In some cases, the downlight diffuser 24 may be disposed at a rear focal plane of the Fresnel lens 23. In some cases, an enclosure may laterally surround the volume between the plurality of downlight LEDs 22 and the downlight diffuser 24. In some cases, a heat sink (not shown) may be disposed on the enclosure. In some cases, circuitry (not shown) for driving the plurality of downlight LEDs 22 may be incorporated within the enclosure. In some cases, the downlight beam footprint 28 may be centered on the bottom face of the lightguide 3.

Figure 3:
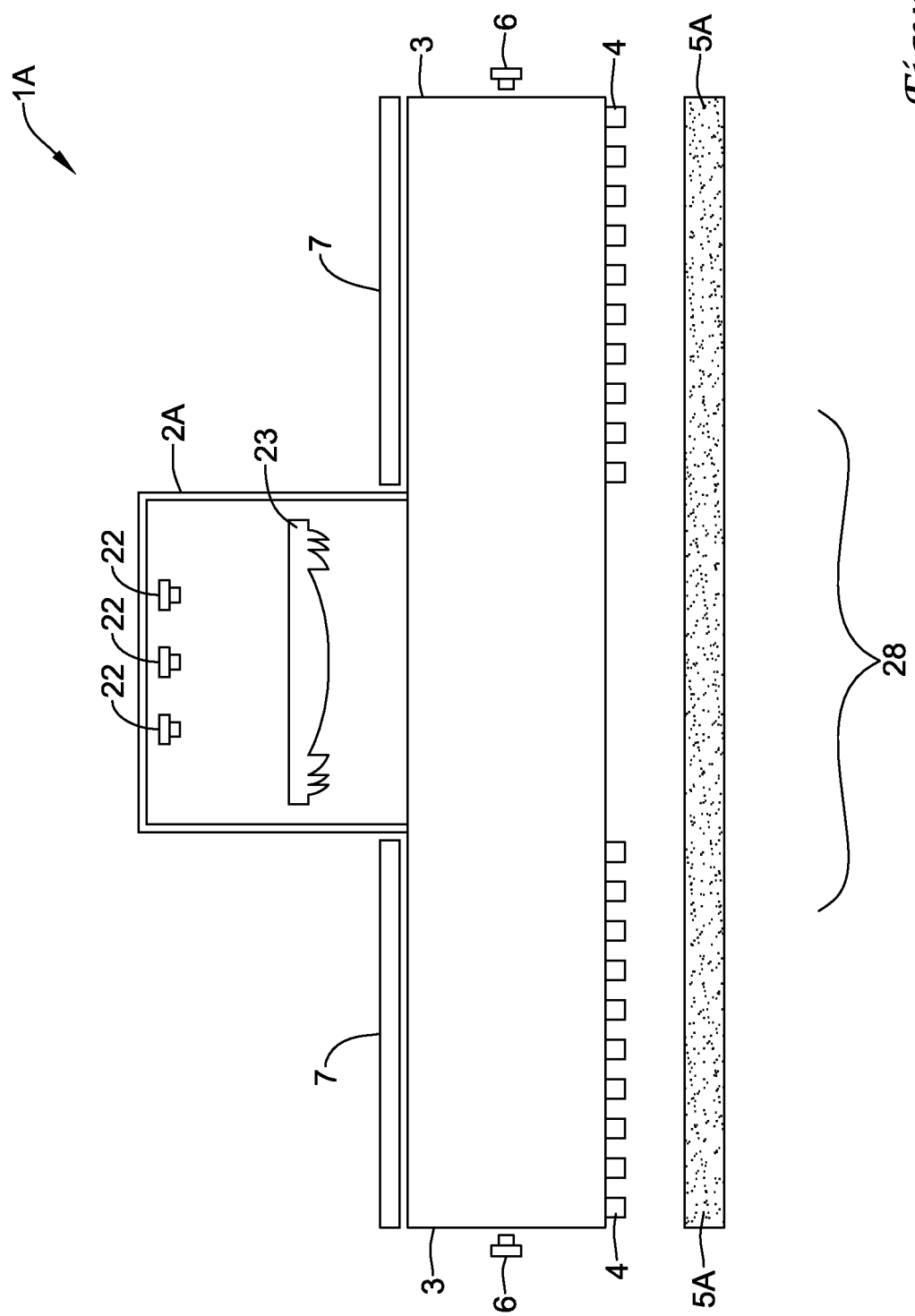
FIG. 3 is a side-view schematic drawing of another example light fixture, with a single diffuser.

As an alternative to the design of FIG. 1, the downlight diffuser 24 may be incorporated into the diffuser 5. FIG. 3 is a side-view schematic drawing of another example light fixture 1A, with a single diffuser 5A. In some cases, this single diffuser 5A has its diffusing properties being uniform across the full surface of the diffuser 5A. In other cases, the single diffuser 5A has one diffusing property outside the downlight beam footprint 28, and a weaker diffusing property inside the downlight beam footprint 28, corresponding to the weaker diffuser 24 described above. In some cases, the downlight 2A may be modified, with its longitudinal spacings adjusted so that the diffuser 5A falls at or near the rear focal plane of the Fresnel lens 23.

Figure 5:
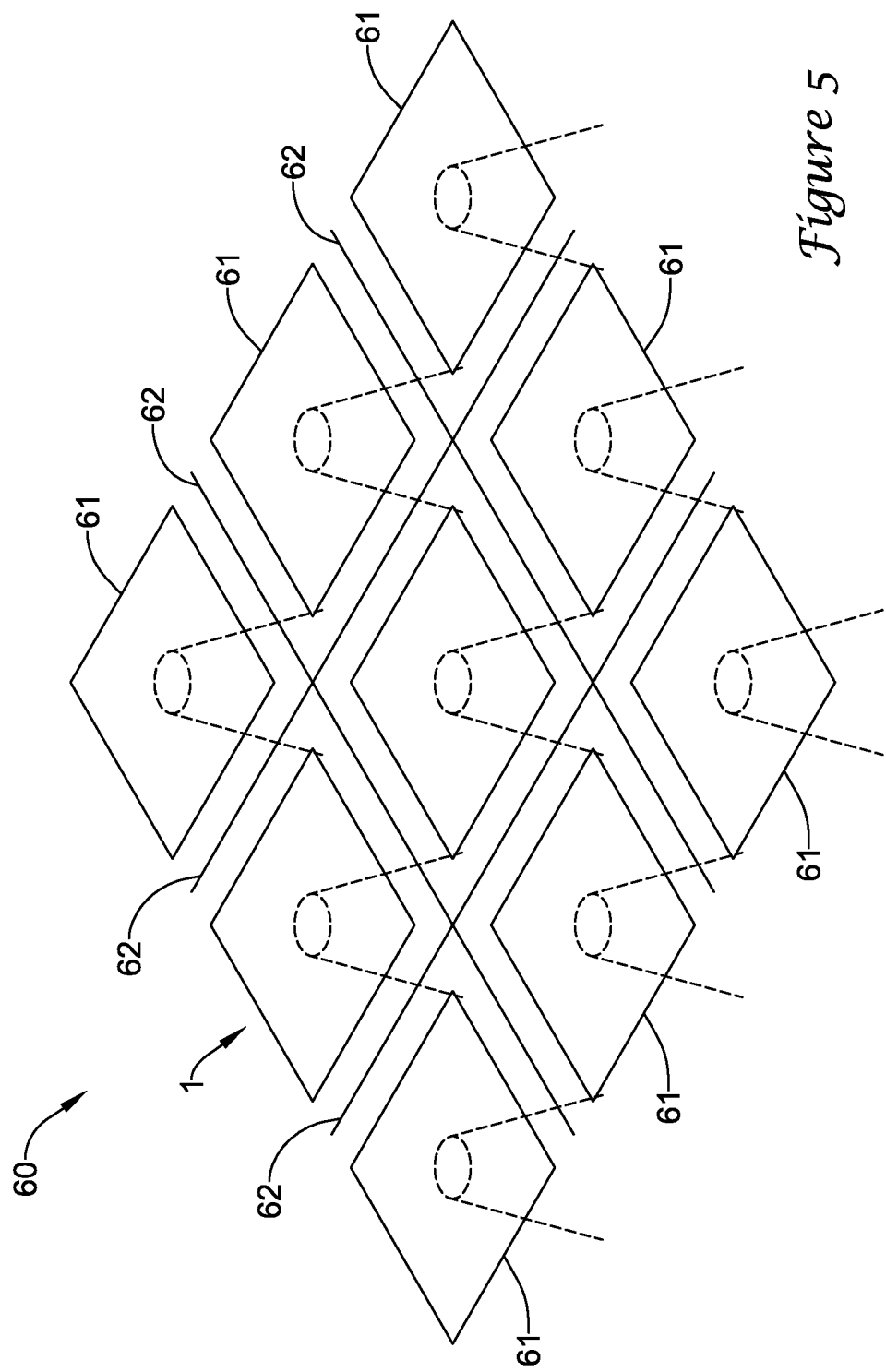
FIG. 5 is a perspective drawing of a kit of ceiling fixtures.

As an example of how such a fixture 1 may be used in practice, FIG. 5 is a perspective drawing of a kit 60 of ceiling fixtures, which can incorporate both light fixtures 1 that include a directional beam 21, and similar-looking light fixtures 61 that do not have a directional beam 21. The light fixtures 1 and 61 may be incorporated into respective ceiling tiles, and may be installed in a typical hanging ceiling grid 62. Other configurations may be used as well.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A light fixture for producing downward-propagating illumination, comprising:
    an edge-lit lightguide illuminated with internal light from its perimeter;
    a downlight producing a downlight beam having a downlight beam footprint, the downlight beam transmitting from a top face of the lightguide to a bottom face of the lightguide and emerging from the bottom face of the lightguide as a directional beam;
    a light extractor coupled to the lightguide, the light extractor having a light extractor area on a surface of the light extractor substantially perpendicular to the downlight beam that excludes the downlight beam footprint on the surface, the light extractor directing a predetermined amount of the internal light through the bottom face of the lightguide to form external light; and
    a continuous diffuser longitudinally adjacent to and completely spanning the entire surface of the bottom face of the lightguide, the diffuser having a diffuser area on a surface of the diffuser substantially perpendicular to the downlight beam, the diffuser receiving the external light and transmitting diffuse light wherein the diffuser is a volumetric element including a plurality of particles immersed in a background material, the particles in the plurality having a different refractive index from the background material wherein the plurality of particles are immersed throughout the diffuser except in a volume of the diffuser through which the downlight beam transmits from a top face of the diffuser to a bottom face of the diffuser and emerging from the bottom face of the diffuser as the directional beam.

2. The light fixture of claim 1, wherein the diffuser, the light extractor and the lightguide all have a uniform appearance both inside and outside the downlight beam footprint.

3. The light fixture of claim 1, wherein the directional beam and the diffuse light have the same spectral profiles.

4. The light fixture of claim 1,
    wherein the internal light is produced by a plurality of lateral-facing light emitting diodes around the perimeter of the lightguide;
    wherein the downlight beam is produced by a plurality of downlight light emitting diodes; and
    wherein the lateral-facing light emitting diodes and the downlight light emitting diodes have the same spectral profiles.

5. The light fixture of claim 1, wherein the light extractor includes a repeated feature, the repeated feature being absent in the downlight beam footprint.

6. The light fixture of claim 1, wherein the downlight comprises:
    a plurality of downlight light emitting diodes longitudinally separated from the top face of the lightguide;
    a Fresnel lens disposed longitudinally adjacent to the plurality of downlight light emitting diodes; and
    a downlight diffuser disposed longitudinally adjacent to the Fresnel lens;

wherein light from the plurality of downlight light emitting diodes passing through the Fresnel lens and the downlight diffuser appears generally uniform when viewed at the downlight diffuser.

7. The light fixture of claim 6,
wherein the plurality of downlight light emitting diodes are disposed at a front focal plane of the Fresnel lens; and
wherein the downlight diffuser is disposed at a rear focal plane of the Fresnel lens.

8. The light fixture of claim 6, wherein the downlight further includes:
an enclosure laterally surrounding the volume between the plurality of downlight light emitting diodes and the downlight diffuser;
a heat sink disposed on the enclosure; and
circuitry for driving the plurality of downlight light emitting diodes.

9. The light fixture of claim 1, wherein the downlight beam footprint is centered on the bottom face of the lightguide.

10. The light fixture of claim 1, wherein the lightguide and the downlight are incorporated into a ceiling tile.

11. The light fixture of claim 10, wherein the ceiling tile is included as part of a kit that includes at least one illumination light fixture that has the same appearance but lacks a downlight.

12. A light fixture for producing downward-propagating illumination, comprising:
an edge-lit lightguide;
a downlight disposed adjacent to a top face of the lightguide for directing directional light through the lightguide and out a bottom face of the lightguide, the directional light beam having a downlight beam footprint wherein the downlight includes a plurality of downlight light emitting diodes longitudinally separated from the top face of the lightguide, the downlight light emitting diodes having the same spectral profile as the plurality of peripheral light emitting diodes and the downlight further includes:
a Fresnel lens disposed longitudinally adjacent to the plurality of downlight light emitting diodes and
a downlight diffuser disposed longitudinally adjacent to the Fresnel lens;
wherein light from a plurality of downlight light emitting diodes passing through the Fresnel lens and the downlight diffuser appears generally uniform when viewed at the downlight diffuser;
the plurality of peripheral light emitting diodes disposed around a perimeter of the lightguide for emitting light into the lightguide;
a light extractor coupled to the lightguide for directing light out of the lightguide to form extracted light, the extractor area excluding the downlight beam footprint wherein the excluded downlight beam footprint allowing the directional light beam to pass from a top face of the light extractor through and to a bottom face of the light extractor and out the light fixture as directional light beam of the light fixture; and
a diffuser longitudinally adjacent to the bottom face of the lightguide and completely covering the bottom face, the diffuser receiving extracted light from the light extractor and transmitting diffuse light out of the light fixture as ambient light wherein the diffuser is a volumetric element including a plurality of particles immersed in a background material, the particles in the plurality having a different refractive index from the background material wherein the plurality of particles are immersed throughout the diffuser except in a volume of the diffuser through which the directional light beam transmits from a top face of the diffuser to a bottom face of the diffuser and emerging from the bottom face of the diffuser as the directional light beam;
wherein the directional light beam has a more narrow angular spread than the diffuse light; and
wherein the directional light beam has the same spectral profile as the diffuse light.

13. The light fixture of claim 12, wherein the light extractor includes a dot pattern, the dot pattern being absent in the downlight beam footprint.

14. The light fixture of claim 12, wherein the downlight further includes:
an enclosure laterally surrounding the volume between the plurality of downlight light emitting diodes and the downlight diffuser;
a heat sink disposed on the enclosure; and
circuitry for driving the plurality of downlight light emitting diodes.

15. The light fixture of claim 12, wherein the diffuser, the light extractor and the lightguide all have a uniform appearance both inside and outside the downlight beam footprint.

\* \* \* \* \*